UNITED STATES PATENT OFFICE.

DUNCAN M. ANDERSON, OF TORONTO, ONTARIO, CANADA.

PROCESS OF MAKING PREPARED FOOD.

1,415,137.     Specification of Letters Patent.     Patented May 9, 1922.

No Drawing.     Application filed April 9, 1918. Serial No. 227,475.

*To all whom it may concern:*

Be it known that I, DUNCAN MACKENZIE ANDERSON, a subject of the King of Great Britain, and resident of the city of Toronto, county of York, Province of Ontario, in the Dominion of Canada, have invented a new and useful Process of Making Prepared Food, as described in the following specification.

The principal objects of this invention are, to provide a prepared food having an extremely high nutritive quality and further to produce a prepared chocolate which will be easily digested and which can be prepared with the minimum of difficulty.

The principal feature of the invention consists in the novel manner of preparing and uniting the ingredients used, whereby the fatty substances are held in suspension in a dry absorbent carrier in powder form.

It is very well known that chocolate as a beverage is extremely palatable and has remarkable nutritive properties but when combined with milk and prepared in the ordinary manner is indigestible. This indigestible feature is the result of the chocolate and milk and sugar being boiled together.

Many attempts have been made to unite chocolate and milk to produce a prepared food to which water might be added to convert it into a beverage and milk and chocolate have been emulsified in various ways. None of these processes resulted in a successful product but by the application of the process herein described I have produced a product which has been thoroughly tested and has a peculiar faculty of being very easily assimilated and digested by persons having very weak digestive organs.

The chocolate is melted in a suitable chocolate kettle at a temperature around 100°. The required quantity is then poured on desiccated skim milk in a suitable mixing machine, a sufficient quantity of dry powdered cane sugar being then added to render it mildly sweet. This mixture is then dumped into a wood machine with wood fibre brushes which thoroughly rub the ingredients together so that the excess cocoa butter in the chocolate is absorbed by the dry milk and sugar, the machine being kept warm during the process by being suitably enclosed in a heated atmosphere. The fats taken up by the milk and sugar make the powder slightly sticky which stickiness disappears as soon as the powder is discharged from the second machine. It is then allowed to cool at a temperature under 60°.

It is found in practice that in the cooling, the powder has a slight tendency to cake and prior to packaging it is passed through a suitable screening machine which passes it out in the form of a dry brown powder. This powder is a mixture of sugar, milk and chocolate in the necessary proportions to produce a beverage of a very delicious quality and two or three teaspoonfuls of which when mixed with boiling water would have the desired effect.

It is important in the treatment of the chocolate that the temperature be not raised to a cooking temperature which has the effect of rendering the ingredients indigestible and it is further pointed out that no evaporating action of any kind is resorted to but that the milk is in the form of a dry absorbent and when mixed with the cholocate it forms an active carrier for the surplus chocolate oils maintaining the product in dry powder form.

What I claim as my invention is:—

1. A process of making prepared food, consisting in first placing within a mixing machine a quantity of desiccated skim milk, then introducing a quantity of melted chocolate, then adding powdered sugar, and thoroughly mixing the ingredients which are in such proportions that the dry materials will thoroughly absorb the natural fats of the chocolate and the final product is in dry powder form.

2. A process of making prepared food, consisting in placing within a mixing machine a definite quantity of desiccated skim milk, then pouring into the powdered milk during agitation, melted chocolate and powdered sugar in such quantity that the natural fats of the chocolate will be absorbed by the desiccated milk to produce a finished product in a dry comminuted form, then submitting the mixture to a rubbing action by fibre brushes to thoroughly amalgamate the ingredients and reduce the mass to a dry powder form.

D. M. ANDERSON.